US008511816B2

(12) United States Patent
Moore

(10) Patent No.: US 8,511,816 B2
(45) Date of Patent: Aug. 20, 2013

(54) APPARATUS AND METHOD FOR OPERATING A FLATTENER IN AN INK-BASED PRINTING APPARATUS

(75) Inventor: Steven Robert Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 306 days.

(21) Appl. No.: 12/889,844

(22) Filed: Sep. 24, 2010

(65) Prior Publication Data

US 2012/0075395 A1 Mar. 29, 2012

(51) Int. Cl.

| | |
|---|---|
| ***B41J 2/01*** | (2006.01) |
| ***B41J 2/175*** | (2006.01) |
| ***G01D 15/04*** | (2006.01) |

(52) U.S. Cl.
USPC .............................. 347/104; 347/88; 346/138

(58) Field of Classification Search
None
See application file for complete search history.

(56) References Cited

U.S. PATENT DOCUMENTS

| | | | | |
|---|---|---|---|---|
| 5,121,139 | A * | 6/1992 | Burke | 346/138 |
| 5,455,604 | A * | 10/1995 | Adams et al. | 346/138 |
| 6,179,286 | B1 * | 1/2001 | Bennett | 271/212 |
| 7,720,401 | B2 | 5/2010 | Domoto et al. | |
| 2009/0224461 | A1 * | 9/2009 | Mitsuya et al. | 271/11 |
| 2010/0020145 | A1 * | 1/2010 | Gervasi et al. | 347/88 |

* cited by examiner

*Primary Examiner* — Stephen Meier
*Assistant Examiner* — Alexander C Witkowski
(74) *Attorney, Agent, or Firm* — Ronald E. Prass, Jr.; Prass LLP

(57) ABSTRACT

An apparatus and method that operates a flattener in an ink-based printing apparatus. The printing apparatus can include a media path configured to transport media sheets. The printing apparatus can include a marking module configured to jet ink drops to generate images on the media sheets. The printing apparatus can include a flattener configured to flatten the ink jet drops of the images on the media sheets in a flattener nip. The printing apparatus can include a release agent distributer configured to distribute release agent on a first rotational flattener member. The printing apparatus can include a controller configured to control the printing apparatus to reduce an inter-copy gap distance between a first media sheet and a second media sheet to prevent a first rotational flattener member from contacting a second rotational flattener member between the first media sheet and the second media sheet.

19 Claims, 5 Drawing Sheets

APPARATUS AND METHOD FOR OPERATING A FLATTENER IN AN INK-BASED PRINTING APPARATUS

RELATED APPLICATIONS

This application is related to the application entitled "Apparatus and Method for Reducing Fuser Noise in a Printing Apparatus," Ser. No. 12/842,443, filed Jul. 23, 2010, which is commonly assigned to the assignee of the present application, and which is incorporated herein by reference in its entirety.

BACKGROUND

Disclosed herein is an apparatus and method that operates a flattener in an ink-based printing apparatus.

Solid inks and ultraviolet gel inks can be jetted directly onto cut sheet media in printing devices using ink jet direct marking technology. In such a process, after ink has been deposited on a media sheet, it is expected that the ink must be thermally leveled by a leveler and then spread to a final dot size in a flattener device, such as in spreader nip. The spreader nip includes a heated spreader roll which contacts the ink and a backing pressure roll that supplies the necessary 1.0-1.5 Kpsi nip pressure. In order to prevent ink on the media sheets from offsetting to the spreader roll, the spreader roll has a silicone oil film maintained on its surface.

This oil film will transfer from the spreader roll surface to the pressure roll surface when there is no sheet in the nip, such as is the case during an inter-copy gap between sheets. Oil from the pressure roll surface is transferred to the backside of the next media sheet it enters the spreader nip. This means that when an image is spread on a first side of a media sheet when it passes through the spreader nip, the second side becomes contaminated with oil.

This causes an undesirable result for duplex operation where images are printed on both sides of a media sheet. The problem is that oil contamination of the second side of a media sheet leads to loss of ink adhesion to the second side. One possible solution is to cam a flattener nip, such as the spreader nip or a transfix nip, open and closed between each sheet during duplex jobs so that oil is not allowed to transfer from the spreader roll to the pressure roll during inter-copy gaps. Unfortunately, that solution results in a loss of duplex productivity. This becomes impractical when such camming is used in printing devices that require higher productivity, such as beyond 150 ppm.

Thus, there is a need for a method and apparatus that operates a flattener in an ink-based printing apparatus.

SUMMARY

An apparatus and method that operates a flattener in an ink-based printing apparatus is disclosed. The printing apparatus can include a media path configured to transport media sheets. The media sheets can include a first media sheet and can include a second media sheet subsequent to the first media sheet spaced at an inter-copy gap distance from the first media sheet. The printing apparatus can include a marking module configured to jet ink drops for the first media sheet to generate an image on the first media sheet and configured to jet ink drops for the second media sheet to generate an image on the second media sheet. The printing apparatus can include a flattener. The flattener can include a first rotational flattener member including a first rotational flattener member surface. The flattener can include a second rotational flattener member coupled to the first rotational flattener member at a flattener nip. The flattener nip can be configured to flatten the ink jet drops of the image on the first media sheet in the flattener nip and can be configured to flatten the ink jet drops of the image on the second media sheet in the flattener nip. The printing apparatus can include a release agent distributer configured to distribute release agent on the first rotational flattener member. The printing apparatus can include a controller configured to control the printing apparatus to reduce the inter-copy gap distance between the first media sheet and the second media sheet to prevent the first rotational flattener member from contacting the second rotational flattener member between the first media sheet and the second media sheet.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

Figure 1:
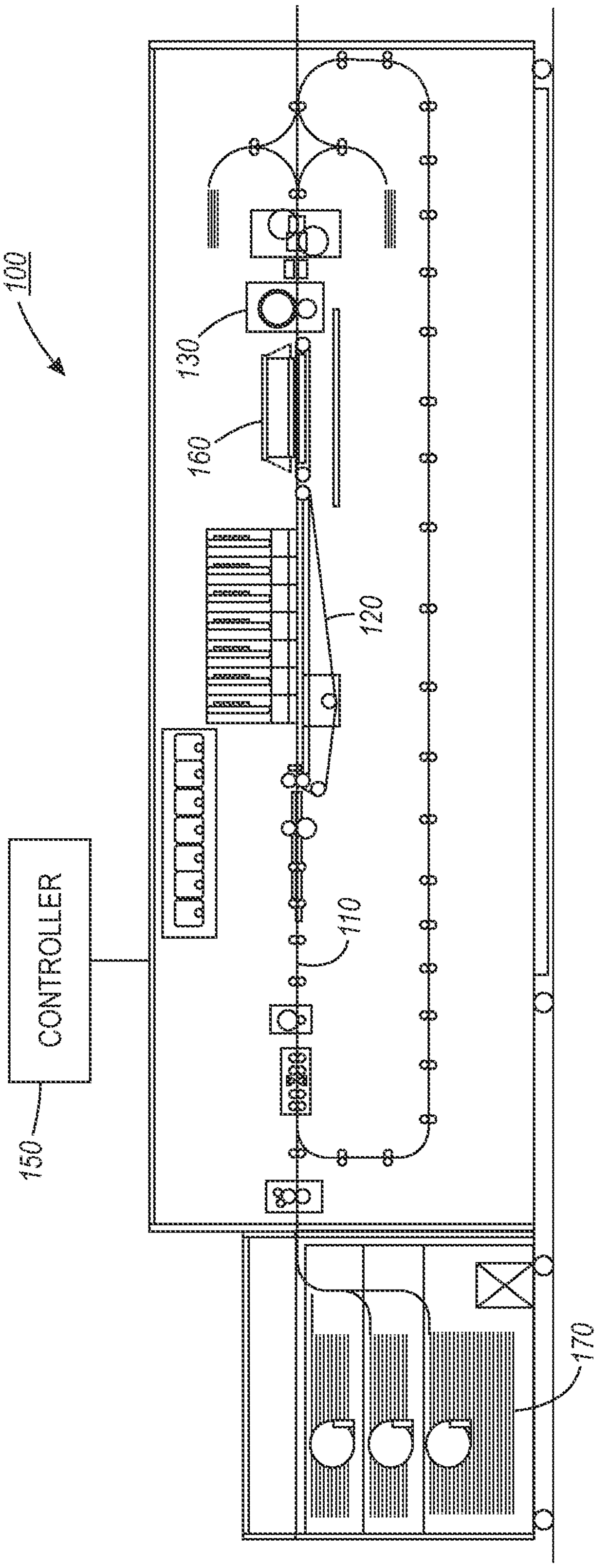
FIG. 1 is an example illustration of a printing apparatus according to one embodiment.

The embodiments include a printing apparatus. The printing apparatus can include a media path configured to transport media sheets. The media sheets can include a first media sheet and can include a second media sheet subsequent to the first media sheet spaced at an inter-copy gap distance from the first media sheet. The printing apparatus can include a marking module configured to jet ink drops for the first media sheet to generate an image on the first media sheet and configured to jet ink drops for the second media sheet to generate an image on the second media sheet. The printing apparatus can include a flattener. The flattener can include a first rotational flattener member including a first rotational flattener member surface. The flattener can include a second rotational flattener member coupled to the first rotational flattener member at a flattener nip. The flattener nip can be configured to flatten the ink jet drops of the image on the first media sheet in the flattener nip and can be configured to flatten the ink jet drops of the image on the second media sheet in the flattener nip. The printing apparatus can include a release agent distributer configured to distribute release agent on the first rotational flattener member. The printing apparatus can include a controller configured to control the printing apparatus to reduce the inter-copy gap distance between the first media sheet and the second media sheet to prevent the first rotational flattener member from contacting the second rotational flattener member between the first media sheet and the second media sheet.

The embodiments further include method in a printing apparatus. The printing apparatus can include a media path, a marking module, a release agent distributer, a controller, and a flattener including a first rotational flattener member having a first rotational flattener member surface and a second rotational flattener member coupled to the first rotational flattener member at a flattener nip. The method can include transporting media sheets along the media path. The media sheets can include a first media sheet and can include a second media sheet subsequent to the first media sheet spaced at an inter-copy gap distance from the first media sheet. The method can include jetting ink drops from the marking module for the first media sheet to generate an image on the first media sheet and jetting ink drops from the marking module for the second media sheet to generate an image on the second media sheet. The method can include flattening the ink jet drops of the image on the first media sheet in the flattener nip and flattening the ink jet drops of the image on the second media sheet in the flattener nip. The method can include distributing release agent from the release agent distributer onto the first rotational flattener member. The method can include reducing the inter-copy gap distance between the first media sheet and the second media sheet to prevent the first rotational flattener member from contacting the second rotational flattener member between the first media sheet and the second media sheet.

The embodiments further include a printing apparatus. The printing apparatus can include a media path configured to transport media sheets. The media sheets can include a first media sheet and can include a second media sheet subsequent to the first media sheet spaced at an inter-copy gap distance from the first media sheet. The printing apparatus can include a marking module configured to jet ink drops for the first media sheet to generate an image on the first media sheet and configured to jet ink drops for the second media sheet to generate an image on the second media sheet. The printing apparatus can include a flattener. The flattener can include a first rotational flattener member including a first rotational flattener member surface. The flattener can include a second rotational flattener member coupled to the first rotational flattener member at a flattener nip. The flattener nip can be configured to flatten the ink jet drops of the image on the first media sheet in the flattener nip and can be configured to flatten the ink jet drops of the image on the second media sheet in the flattener nip. The flattener can include a release agent distributer configured to distribute release agent on the first rotational flattener member. The flattener can include a controller configured to control the printing apparatus to reduce the inter-copy gap distance between the first media sheet and the second media sheet to a distance shorter than a width of the flattener nip width to prevent the first rotational flattener member from contacting the second rotational flattener member between the first media sheet and the second media sheet to minimize release agent transfer from the first rotational flattener member to the second rotational flattener member between the first media sheet and the second media sheet.

FIG. 1 is an example illustration of a printing apparatus 100. The printing apparatus 100 can be an ink-based printing apparatus. The printing apparatus 100 can include a media source 170 configured to feed media sheets, such as paper, plastic, transparencies, labels, or other media sheets. The printing apparatus 100 can include a media transport 110 configured to transport the media sheets. The printing apparatus 100 can include a marking module 120 configured to jet ink drops for the media sheets. The printing apparatus 100 can include a leveler 160 configured to thermally level the ink drops on the media sheets. The printing apparatus 100 can include a flattener 130 configured to flatten the ink drops on the media sheets. For example, the leveler 160 can thermally level a first image on a first media sheet prior to flattening the ink jet drops of the first image on the first media sheet and can thermally level a second image on a second media sheet prior to flattening the ink jet drops of the second image on the second media sheet. The printing apparatus 100 can include a controller 150 configured to control operations of the printing apparatus 100. The printing apparatus 100 will be described in more detail in the subsequent drawings.

Figure 2:
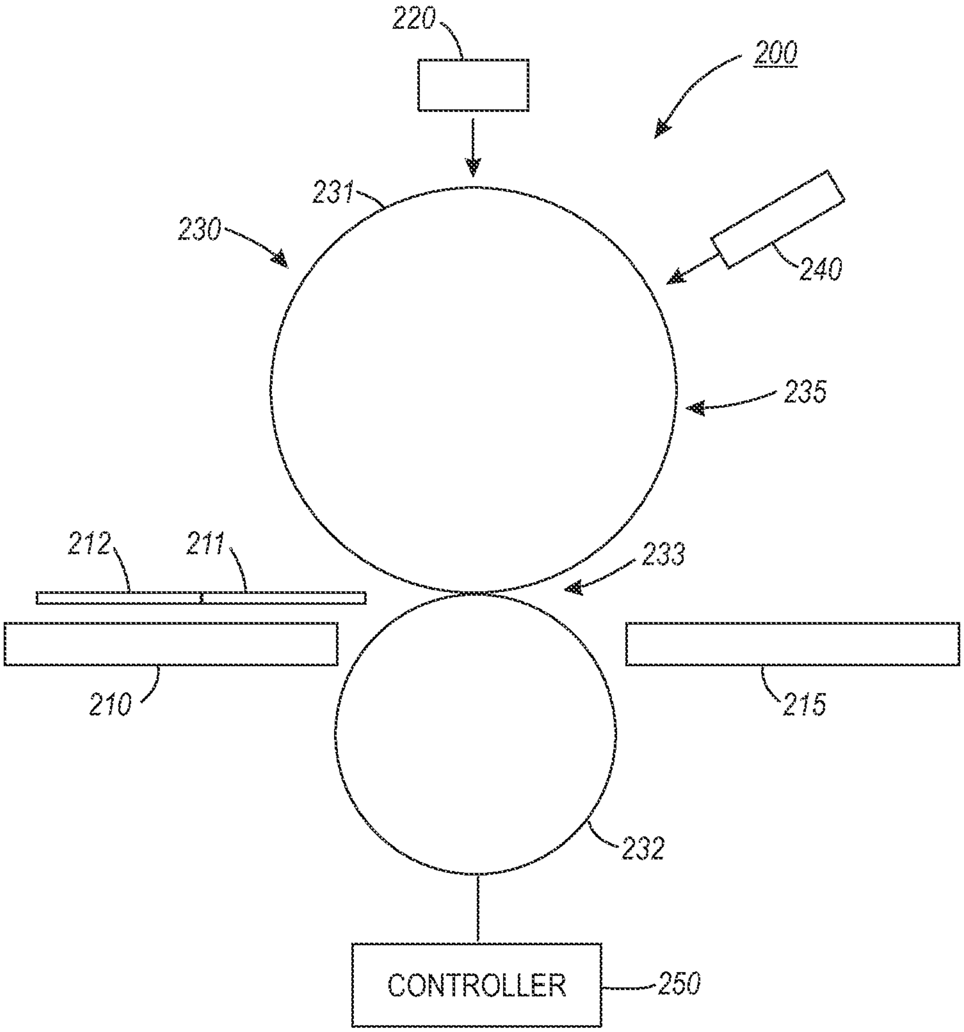
FIG. 2 is an example illustration of a printing apparatus according to another embodiment.

FIG. 2 is an example illustration of a printing apparatus 200 according to another embodiment. The printing apparatus 200 may or may not include elements disclosed in other embodiments. The printing apparatus 200 can include a media path 210 configured to transport media sheets. The media sheets can include a first media sheet 211 and a second media 212 sheet subsequent to the first media sheet 211 spaced at an inter-copy gap distance from the first media sheet 211. The printing apparatus 200 can include a marking module 220 configured to jet ink drops for the first media sheet 211 to generate an image on the first media sheet 211 and configured to jet ink drops for the second media sheet 212 to generate an image on the second media sheet 212.

The printing apparatus 200 can include a flattener 230. The flattener 230 can include a first rotational flattener member 231 including a first rotational flattener member surface 235. The flattener 230 can include a second rotational flattener member 232 coupled to the first rotational flattener member 231 at a flattener nip 233. The flattener nip 233 can be configured to flatten the ink jet drops of the image on the first media sheet 211 in the flattener nip 233 and configured to flatten the ink jet drops of the image on the second media sheet 212 in the flattener nip 233.

The printing apparatus 200 can include a release agent distributer 240 configured to distribute release agent on the first rotational flattener member surface 235. The release agent can be silicone oil or any other release agent that can prevent ink drops from adhering to flattener member surface 235. The printing apparatus 200 can include a controller 250 configured to control the printing apparatus 200 to reduce the inter-copy gap distance between the first media sheet 211 and the second media sheet 212 to prevent the first rotational flattener member 231 from contacting the second rotational flattener member 232 between the first media sheet 211 and the second media sheet 212.

The printing apparatus 200 can include an intermediate transfer surface. The intermediate transfer surface can be the first rotational flattener member surface 235 or can be another transfer surface. According to this embodiment, the intermediate transfer surface is the first rotational flattener member surface 235. The marking module 240 can be configured to jet ink drops onto the intermediate transfer surface 235 and the intermediate transfer surface 235 can be configured to transfer the ink jet drops to the media sheets to generate images on the media sheets. The intermediate transfer surface 235 can be a heated intermediate transfer surface, can be a drum intermediate transfer surface, can be a belt intermediate transfer surface, or can be any other intermediate transfer surface that can transfer ink drops from a marking module to media sheets. The flattener 230 can include the intermediate transfer surface 235 in that it can transfix images from the intermediate transfer surface 235 to media sheets. It can transfix images by transferring the image from the intermediate transfer surface 235 and by affixing, spreading, and/or flattening, the ink drops onto media sheets.

The media path 210 can include an upstream media path 210 upstream from media sheet travel from the flattener 230. The upstream media path 210 can transport the first media sheet 211 and the second media sheet 212 at a first velocity. The flattener 230 can be configured to operate at a second velocity slower than the first velocity to reduce the inter-copy gap distance between the first media sheet 211 and the second media sheet 212. The media path 210 can include a downstream media path 215 downstream from media sheet travel from the flattener 230. The downstream media path 215 can transport the first media sheet 211 and the second media sheet 212 at a third velocity different from the second velocity. All of the velocities may be different or equal depending on intended operation of the printing apparatus 200.

Figure 3:
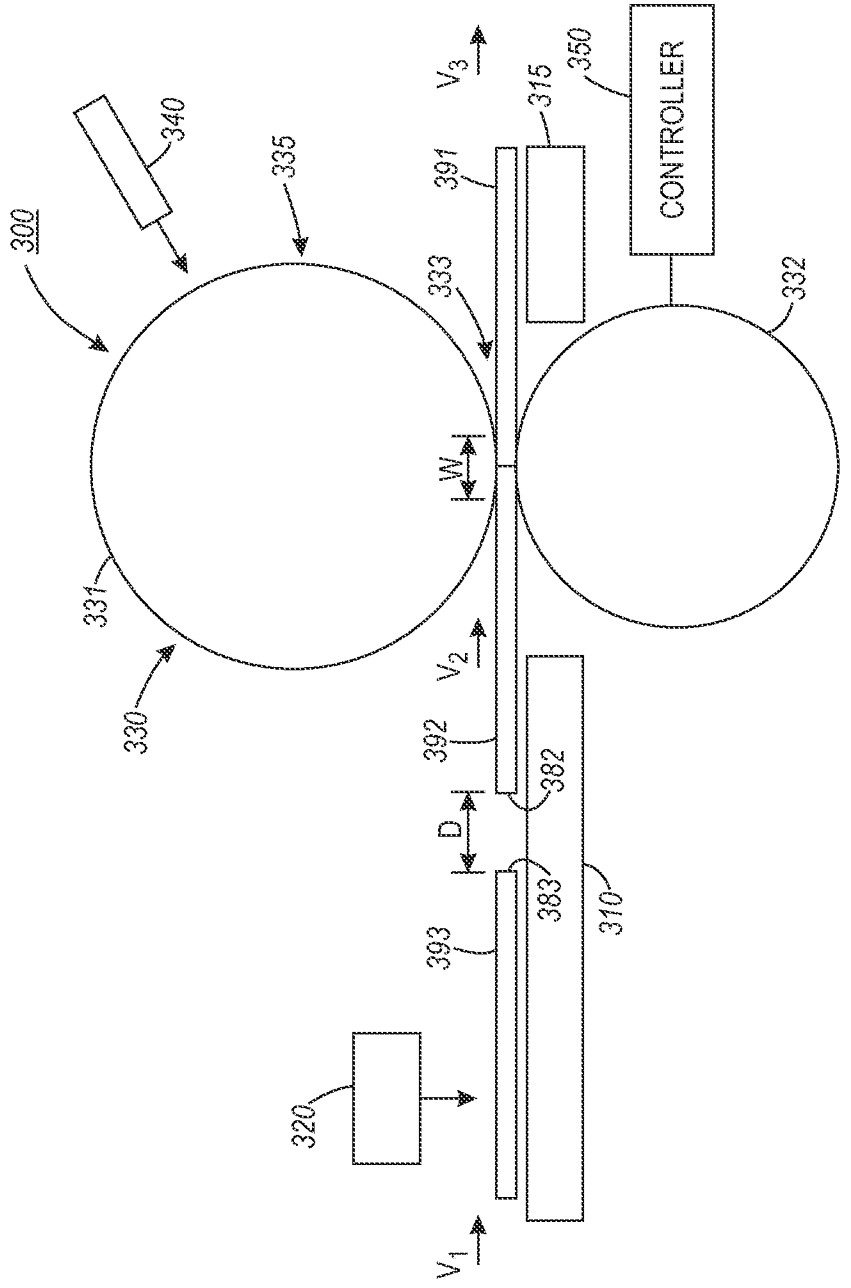
FIG. 3 is an example illustration of a printing apparatus according to another embodiment.

FIG. 3 is an example illustration of a printing apparatus 300 according to another embodiment. The printing apparatus 300 may or may not include elements disclosed in other embodiments. The printing apparatus 300 can include a media path 310 configured to transport media sheets. The media sheets can include a first media sheet 391 and a second media sheet 392 subsequent to the first media sheet spaced at an inter-copy gap distance from the first media sheet 391. The media path 310 can transport additional media sheets, such as a third media sheet 393 spaced at an inter-copy gap distance D from the second media sheet 392, where the inter-copy gap distance D illustrates the inter-copy gap distance between media sheets prior to a flattener nip. The terms "first," "second," and "third" are relative and are used to indicate one media sheet precedes another media sheet when traveling in the printing apparatus 300. For example, the term "first" is used to indicate the first media sheet 391 precedes the second media sheet 392 and it does not necessarily indicate the first media sheet 391 is the absolute first media sheet in any given context.

The printing apparatus 300 can include a marking module 320 configured to jet ink drops for the first media sheet 391 to generate an image on the first media sheet 391 and configured to jet ink drops for the second media sheet 392 to generate an image on the second media sheet 392. The printing apparatus 300 can include a flattener 330. The flattener 330 can include a first rotational flattener member 331 including a first rotational flattener member surface 335. The flattener 330 can include a second rotational flattener member 332 coupled to the first rotational flattener member 331 at a flattener nip 333. The first rotational flattener member 331 can be a heated flattener roll and the second rotational flattener member 332 can be a pressure flattener roll.

The flattener nip 333 can be configured to flatten the ink jet drops of the image on the first media sheet 391 in the flattener nip 333 and configured to flatten the ink jet drops of the image on the second media sheet 392 in the flattener nip 333. The printing apparatus 300 can include a release agent distributer 340 configured to distribute release agent on the first rotational flattener member 331. The printing apparatus 300 can include a controller 350 configured to control the printing apparatus 300 to reduce the inter-copy gap distance D between the first media sheet 391 and the second media sheet 392 to prevent the first rotational flattener member 331 from contacting the second rotational flattener member 332 between the first media sheet 391 and the second media sheet 392.

The marking module 320 can be configured to jet ink drops directly onto the media sheets to generate images on the media sheets. For example, when the marking module 320 is configured to jets ink drops directly onto the media sheets, the flattener 330 can be separate in the printing apparatus 300 from elements that transfer ink drops to the media sheets. The flattener 330 can be spreader that flattens, such as by affixing, by spreading, and/or by flattening, the ink drops onto media sheets after the marking module 320 places the ink drops on media sheets. As a further example, spreading can change the size of dots on the media sheets from the ink drops. The dots may be built up from multiple drops of ink from the marking module 320.

The ink from the marking module 320 can exist in either a solid or gel state at room temperature. The ink can also have a viscosity of a liquid when heated to a temperature useful in a printing apparatus. For example, the ink may be a non-liquid at room temperature and can be heated to a liquid state to transfer drops to media sheets. The ink may also be a liquid at room temperature. As a further example, a gel can be a solid, jelly-like material that can have properties ranging from soft and weak to hard and tough. A gel can be a substantially dilute crosslinked system, which exhibits no flow when in the steady-state. By weight, a gel can be mostly liquid, yet it can behave like a solid due to a three-dimensional crosslinked network within the liquid. The crosslinks within the fluid can give a gel its structure, such as hardness, and they contribute to stickiness, such as tack. In this way a gel can be a dispersion of molecules or particles within a liquid in which the solid is the continuous phase and the liquid is the discontinuous phase.

The controller 350 can control the printing apparatus 300 to reduce the inter-copy gap distance D between the first media sheet 391 and the second media sheet 392 to minimize release agent transfer from the first rotational flattener member 331 to the second rotational flattener member 332 between the first media sheet 391 and the second media sheet 392. For example, if release agent is transferred to the second rotational flattener member 332, the release agent can adhere to the back side of media sheets. This can cause a problem in duplex print jobs because the release agent on the back side of media sheets can reduce the adhesion of ink to the back side of the media sheets. Thus, the printing apparatus 300 can reduce and/or prevent the transfer of release agent to the back side of media sheets.

The second rotational flattener member 332 can be selectively coupled to the first rotational flattener member 331 at the flattener nip 333. For example, a cam mechanism, a hydraulic mechanism, or other mechanism (not shown) can be used to engage and disengage the first rotational flattener member 331 with the second rotational flattener member 332. The controller 350 can control the printing apparatus 300 to decouple the second rotational flattener member 332 from the first rotational flattener member 331 at the flattener nip 333 between printing apparatus print jobs.

The media path 310 can include an upstream media path 310 upstream of media sheet travel from the flattener 330. The upstream media path 310 can transport the first media sheet 391 and the second media sheet 392 at a first velocity $V_1$. The flattener can operate at a second velocity $V_2$ slower than the first velocity $V_1$ to reduce the inter-copy gap distance D between the first media sheet 391 and the second media sheet 392. The media path 310 can include a downstream media path 315 downstream from media sheet travel in the flattener 330. At least a portion the downstream media path 315 can be configured to transport the first media sheet 391 and the second media sheet 392 at a third velocity $V_3$ faster than the second velocity $V_2$ to restore the inter-copy gap distance D substantially to the inter-copy gap distance D before the inter-copy gap distance D was reduced.

The flattener nip 333 can include a flattener nip width Win a media sheet travel direction. The controller 350 can control the printing apparatus 300 to reduce the inter-copy gap distance between the first media sheet 391 and the second media sheet 392 to a distance shorter than the flattener nip width W.

The second media sheet 392 can include a trail edge 382. The third media sheet 393 can include a lead edge 383. The controller 350 can control the printing apparatus 300 to reduce the inter-copy gap distance D between the second media sheet 392 and the third media sheet 393 to overlap the second media sheet trail edge 382 with the third media sheet lead edge 383. Again, the numerical labeling of the media sheets is relative to their position in the printing apparatus 300 and references between the second media sheet 392 and the third media sheet 393 can apply to the first media sheet 391 and the second media sheet 392, respectively, at different times in the printing apparatus 300.

Figure 4:
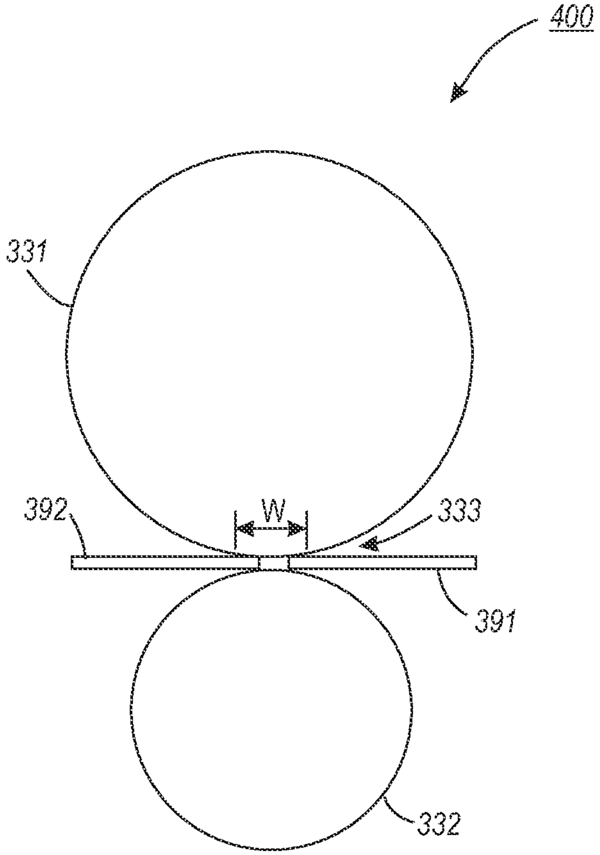
FIG. 4 is an example illustration of a flattener according to one embodiment.

FIG. 4 is an example illustration of a flattener 400, such as the flattener 330, 230, or 130. Elements of the flattener 400 can be used with other embodiments. The flattener 400 can include the first rotational flattener member 331, and the second rotational flattener member 332 coupled to the first rotational flattener member 331 at a flattener nip 333. The flattener nip 333 can have a flattener nip width W. Media sheets 391 and 392 can pass through the flattener nip 333. An inter-copy gap between the media sheets 391 and 392 can be reduced to a distance shorter than the flattener nip width W. Thus, the media sheets 391 and 392 can prevent the first rotational flattener member 331 from contacting the second rotational flattener member 332 in the inter-copy gap because one sheet is always present in the flattener nip 333, even in the inter-copy gap.

Figure 5:
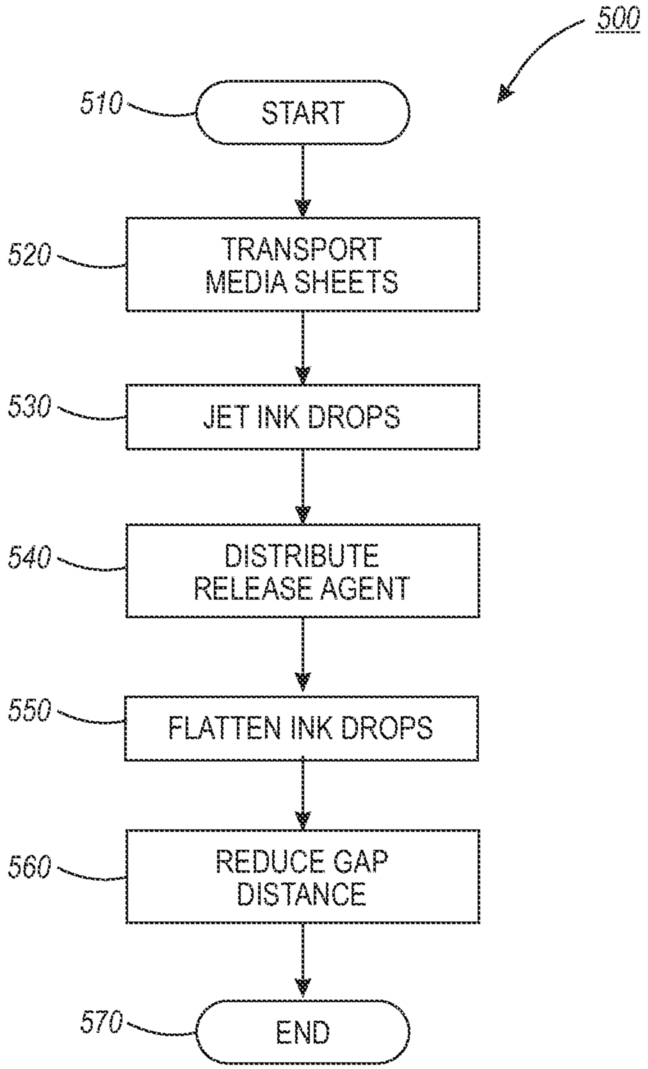
FIG. 5 illustrates an example flowchart of a method in a printing apparatus according to one embodiment.

FIG. 5 illustrates an example flowchart 500 of a method in a printing apparatus. The printing apparatus can include a media path, a marking module, a flattener, a release agent distributer, and a controller. The flattener can include a first rotational flattener member having a first rotational flattener member surface and a second rotational flattener member coupled to the first rotational flattener member at a flattener nip. The printing apparatus can also include an intermediate transfer surface. At 510, the flowchart 500 begins.

At 520, media sheets are transported along the media path. The transported media sheets can include a first media sheet and a second media sheet subsequent to the first media sheet spaced at an inter-copy gap distance from the first media sheet. At 530, the marking module can jet ink drops for the first media sheet to generate an image on the first media sheet and the marking module can jet ink drops for the second media sheet to generate an image on the second media sheet. The marking module can jet ink drops onto the intermediate transfer surface and the ink jet drops can be transferred from the intermediate transfer surface to the media sheets to generate images on the media sheets. The marking module can also jet ink drops directly onto the media sheets to generate images on the media sheets. The ink can exist as either a solid or gel at room temperature and the ink can have a viscosity of a liquid when heated to a temperature useful in a printing apparatus.

At 540, release agent can be distributed from the release agent distributer onto the first rotational flattener member. At 550, the ink jet drops of the image on the first media sheet can be flattened onto the first media sheet in the flattener nip and the ink jet drops of the image on the second media sheet can be flattened onto the second media sheet in the flattener nip. At 560, the inter-copy gap distance between the first media sheet and the second media sheet can be reduced to prevent the first rotational flattener member from contacting the second rotational flattener member between the first media sheet and the second media sheet. The inter-copy gap distance can be reduced to minimize release agent transfer from the first rotational flattener member to the second rotational flattener member between the first media sheet and the second media sheet. At 570, the method ends.

The flowchart 500 can include other operations of other embodiments of the printing apparatus. Also, according to some embodiments, all of the blocks of the flowchart 500 are not necessary. Additionally, the flowchart 500 or blocks of the flowchart 500 may be performed numerous times, such as iteratively. For example, the flowchart 500 may loop back from later blocks to earlier blocks. Furthermore, many of the blocks can be performed concurrently or in parallel processes.

Embodiments can schedule and time media sheets within a print job such that there is nominally zero inter-copy gap between the media sheets as they enter a flattener nip, such as a spreader nip. This can prevent any oil transfer from a spreader roll to a pressure roll during a duplex job without any productivity loss due to nip opening and closing. The spreader nip can still open and close at the start and end of a job and at any interruptions in sheet flow due to any scheduled gaps in sheet delivery, but overall productivity can be improved and the spreader nip opening and closing time requirements can be relaxed since it does not need to support the very short inter-copy gap times.

For example, in a printing apparatus, printing can be done on cut sheets in a single pass mode as they pass across a print platen transport. Sheets can then be conveyed past a leveler transport, whose function can be to bring all jetted ink to the same elevated temperature. Sheets can then pass through a spreader nip where the ink is spread under high pressure and elevated temperature to its final film thickness on the media sheets. For duplex printing, sheets can be inverted and then routed along a duplex path to return for printing on the opposite side. By reducing the inter-copy gap between media sheets, oil used as a release agent on a spreader roll may not contaminate the opposite side of the sheets prior to their return to the print platen transport.

Embodiments can provide for substantially zero inter-copy gap between successive sheets so that just as the first sheet's trail edge exits the spreader nip, the next sheet's lead edge enters the nip. This can prevent oil transfer from the spreader roll to the pressure roll, and the spreader nip can remain closed as long as there is a subsequent sheet arriving. The zero inter-copy gap condition can be achieved by running the spreader at a particular constant speed setpoint that is based on the sheet length and based on the upstream inter-copy gap, such as at the print platen transport. The spreader can be run fractionally slower than the upstream transport speed so that the next sheet's lead edge can catch up with the current sheet's trail edge within the spreader nip. The zero inter-copy gap condition can also be achieved by running the spreader at a fixed constant speed and the upstream transport can be responsible for delivering sheets with zero inter-copy gap. The zero inter-copy gap condition can also be achieved by other methods. As each sheet exits from the spreader nip, it can be sped up so that a normal, a previous, or any other desirable inter-copy gap distance can be maintained for downstream transports.

It may be difficult to maintain an absolute zero inter-copy gap between successive sheets due to tolerances of transport velocities, sheet arrival time variation, paper cut sheet length, and any residual sheet skew. Thus, a range of inter-copy gaps can be used to achieve an inter-copy gap distance, such as a substantially zero inter-copy gap distance, that prevents oil transfer between rollers. For example, a small gap can be permissible if it is no larger than the nip width within the spreader. The width of the nip can connote a distance along the nip along the media sheet travel direction. The distance along the nip may also be called a nip length depending on the reference coordinate system. Because there is a finite nip width, typically on the order of millimeters, the nip may not achieve roll-to-roll contact if either an exiting trail edge is still within the nip width, or an incoming lead edge is within the nip width.

As another example, it can be feasible to allow a controlled amount of overlap, such as shingling, between successive sheets while in the nip. This can be accomplished by directing the incoming lead edge along a trajectory not collinear with the nip line. This can prevent the lead edge of a successive sheet from crashing into the prior media sheet trail edge as it catches up to it and can allow an overlap condition to occur. This can be achieved with nip pressures below those required to permanently deform or calendar the overlapped edges, such as pressures below 6 Kpsi, depending on the type of media sheet. Tests have been performed where several thin 60 gsm sheets were run through a transfix nip with strips of 176 gsm paper taped onto each sheet adjacent to its trail edge. After printing, there was no visible evidence of any damage to the 60 gsm sheet correlating to the simulated overlap zone. It can be possible that several millimeters of nominal overlap can be used to achieve a substantially zero inter-copy gap between media sheets.

It is possible for roll-to-roll contact to occur outside of the cross-process width of the sheets along the axis of a spreader roll in a current job. The amount of possible roll-to-roll contact can depend on various parameters, such as roll width, roll durometer, sheet width, roll pressure, roll bending, and other parameters. Any minor variation in cross-process position of successive sheets in a job on the order of a millimeter may not be a concern since any roll-to-roll contact will not occur immediately adjacent to sheets' top or bottom edges. However, undesirable roll-to-roll contact may occur when different media widths used within a job or when a subsequent job uses wider media than the previous job. The concern with differing media widths within a job can be addressed by camming rollers in and out of contact when such a job is encountered, which may result in reduced productivity. Another potential solution can be to automatically program a few cleanup sheets of the wider media that are automatically routed to a purge tray.

Embodiments can provide for a printing system for processing cut sheet media. The printing system can include a spreading nip where the spreading nip can include a spreader roll and a backing pressure member. The spreader roll can have a release agent applied to its periphery and media sheets can be controlled to enter the nip with substantially zero gap between sheets along a process direction.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A printing apparatus comprising:

a media path configured to transport at a first velocity media sheets including a first media sheet and a second media sheet subsequent to the first media sheet spaced at an inter-copy gap distance from the first media sheet;

a marking module configured to jet ink drops for the first media sheet to generate an image on the first media sheet and configured to jet ink drops for the second media sheet to generate an image on the second media sheet;

a flattener configured to operate at a second velocity slower than the first velocity to reduce the inter-copy gap distance between the first media sheet and the second media sheet including:

a first rotational flattener member including a first rotational flattener member surface;

a second rotational flattener member coupled to the first rotational flattener member at a flattener nip, the flattener nip configured to flatten the ink jet drops of the image on the first media sheet in the flattener nip and configured to flatten the ink jet drops of the image on the second media sheet in the flattener nip;

a release agent distributer configured to distribute release agent on the first rotational flattener member; and a controller configured to control the printing apparatus to reduce the inter-copy gap distance between the first media sheet and the second media sheet to prevent the first rotational flattener member from contacting the second rotational flattener member between the first media sheet and the second media sheet;

wherein the second rotational flattener member is selectively coupled to the first rotational flattener member at the flattener nip, wherein media sheets are controlled to enter the flattener nip with substantially zero gap between the media sheets;

wherein the controller is configured to control the printing apparatus to decouple the second rotational flattener member from the first rotational flattener member at the flattener nip between printing apparatus print jobs.

2. The printing apparatus according to claim 1, further comprising an intermediate transfer surface, wherein the marking module is configured to jet ink drops onto the intermediate transfer surface and the intermediate transfer surface is configured to transfer the ink jet drops to the media sheets to generate images on the media sheets.

3. The printing apparatus according to claim 2, wherein the flattener includes the intermediate transfer surface.

4. The printing apparatus according to claim 1, wherein the marking module is configured to jet ink drops directly onto the media sheets to generate images on the media sheets.

5. The printing apparatus according to claim 1, wherein the ink is in a non-liquid state at room temperature and the ink has a viscosity of a liquid when heated to a temperature useful in a printing apparatus.

6. The printing apparatus according to claim 1, further comprising a leveler configured to thermally level the first image on the first media sheet prior to flattening the ink jet drops of the first image on the first media sheet and configured to thermally level the second image on the second media sheet prior to flattening the ink jet drops of the second image on the second media sheet.

7. The printing apparatus according to claim 1, wherein the first rotational flattener member comprises a heated flattener roll and wherein the second rotational flattener member comprises a pressure flattener roll.

8. The printing apparatus according to claim 1, wherein the controller controls the printing apparatus to reduce the inter-copy gap distance between the first media sheet and the second media sheet to minimize release agent transfer from the first rotational flattener member to the second rotational flattener member between the first media sheet and the second media sheet.

9. The printing apparatus according to claim 1, wherein the media path comprises an upstream media path upstream of media sheet travel from the flattener, the upstream media path configured to transport the first media sheet and the second media sheet at a first velocity faster than the second velocity.

10. The printing apparatus according to claim 9, wherein the media path comprises a downstream media path downstream from media sheet travel in the flattener, at least a portion the downstream media path configured to transport the first media sheet and the second media sheet at a third velocity faster than the second velocity to restore the inter-copy gap distance substantially to the inter-copy gap distance before the inter-copy gap distance was reduced.

11. The printing apparatus according to claim 1, wherein the flattener nip includes a flattener nip width in a media sheet travel direction, and wherein the controller is configured to control the printing apparatus to reduce the inter-copy gap distance between the first media sheet and the second media sheet to a distance shorter than the flattener nip width.

12. The printing apparatus according to claim 1, wherein the first media sheet includes a trail edge, wherein the second media sheet includes a lead edge, and wherein the controller is configured to control the printing apparatus to reduce the inter-copy gap distance between the first media sheet and the second media sheet to overlap the first media sheet trail edge with the second media sheet lead edge.

13. A method in a printing apparatus including a media path, a marking module, a flattener including a first rotational flattener member having a first rotational flattener member surface and a second rotational flattener member, a release agent distributer, and a controller, the method comprising:

transporting at a first velocity media sheets along the media path, the media sheets including a first media sheet and a second media sheet subsequent to the first media sheet spaced at an inter-copy gap distance from the first media sheet;

jetting ink drops from the marking module for the first media sheet to generate an image on the first media sheet and jetting ink drops from the marking module for the second media sheet to generate an image on the second media sheet;

flattening the ink jet drops of the image on the first media sheet in the flattener nip and flattening the ink jet drops of the image on the second media sheet in the flattener nip;

distributing release agent from the release agent distributer onto the first rotational flattener member; and operating the flattener at a second velocity slower than the first velocity to reduce the inter-copy gap distance between the first media sheet and the second media sheet so as to prevent the first rotational flattener member from contacting the second rotational flattener member between the first media sheet and the second media sheet;

wherein the second rotational flattener member is selectively coupled to the first rotational flattener member at the flattener nip, wherein media sheets are controlled to enter the flattener nip with substantially zero gap between the media sheets;

wherein the second rotational flattener member is decoupled from the first rotational flattener member at the flattener nip between print jobs.

14. The method according to claim 13, wherein the printing apparatus includes an intermediate transfer surface, and wherein jetting ink drops comprises jetting ink drops onto the intermediate transfer surface and transferring the ink jet drops from the intermediate transfer surface to the media sheets to generate images on the media sheets.

15. The method according to claim 13, wherein jetting ink drops includes jetting ink drops directly onto the media sheets to generate images on the media sheets.

16. The method according to claim 13, wherein the ink is in a non-liquid state at room temperature and the ink has a viscosity of a liquid when heated to a temperature useful in a printing apparatus.

17. The method according to claim 13, wherein reducing the inter-copy gap distance comprises reducing the inter-copy gap distance between the first media sheet and the second media sheet to minimize release agent transfer from the first rotational flattener member to the second rotational flattener member between the first media sheet and the second media sheet.

18. A printing apparatus comprising:

a media path configured to transport at a first velocity media sheets including a first media sheet and a second media sheet subsequent to the first media sheet spaced at an inter-copy gap distance from the first media sheet;

a marking module configured to jet ink drops on the first media sheet to generate an image on the first media sheet and configured to jet ink drops on the second media sheet to generate an image on the second media sheet;

a flattener configured to operate at a second velocity slower than the first velocity to reduce the inter-copy gap distance between the first media sheet and the second media sheet including:

a first rotational flattener member including a first rotational flattener member surface;

a second rotational flattener member coupled to the first rotational flattener member at a flattener nip, the flattener nip configured to flatten the ink jet drops of the image on the first media sheet in the flattener nip and configured to flatten the ink jet drops of the image on the second media sheet in the flattener nip;

a release agent distributer configured to distribute release agent on the first rotational flattener member; and a controller configured to control the printing apparatus to reduce the inter-copy gap distance between the first media sheet and the second media sheet to a distance shorter than a width of the flattener nip width to prevent the first rotational flattener member from contacting the second rotational flattener member between the first media sheet and the second media sheet to minimize release agent transfer from the first rotational flattener member to the second rotational flattener member between the first media sheet and the second media sheet;

wherein media sheets are controlled to enter the flattener nip with substantially zero gap between the media sheets.

19. The printing apparatus according to claim 18, wherein the first rotational flattener member comprises a heated flattener roll and wherein the second rotational flattener member comprises a pressure flattener roll.

* * * * *